Figure 1:
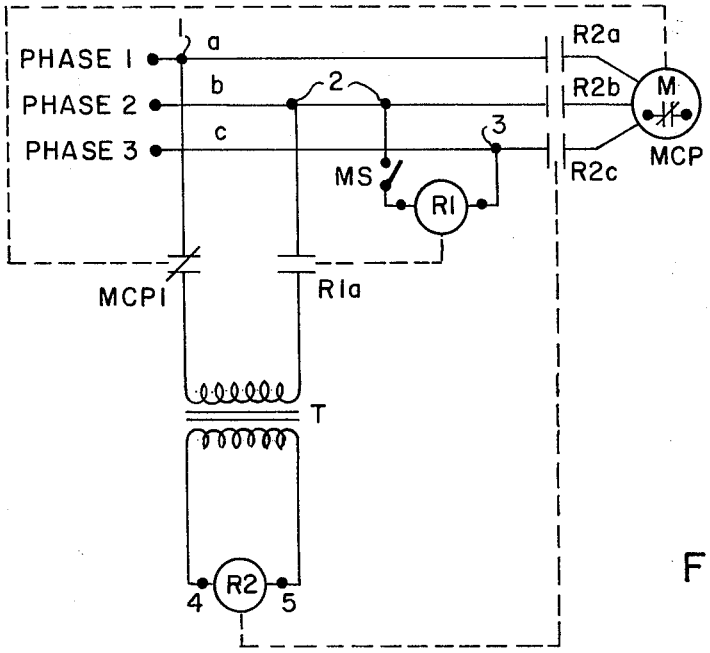
Figure 2:
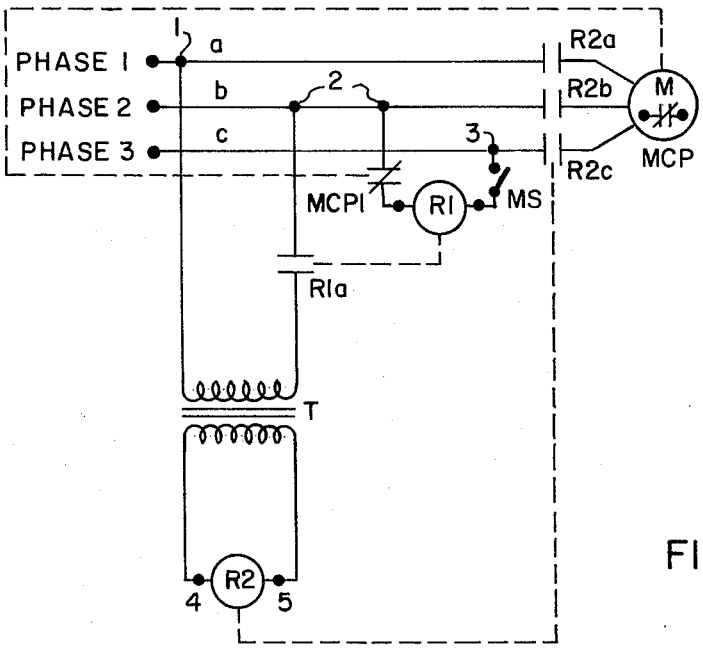

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 5

T948,003

PHASE FAILURE PROTECTION CIRCUIT FOR A REGENERATIVE LOAD

Dannis R. Johnson, Prior Lake, and John E. Waldschmidt, Burnsville, Minn., assignors to Thermo King Corporation, Minneapolis, Minn.

Continuation of abandoned application Ser. No. 497,343, Aug. 14, 1974. This application May 7, 1975, Ser. No. 575,290

Int. Cl. H02h *3/32*

U.S. Cl. 317—46

1 Sheet Drawing. 10 Pages of Specification

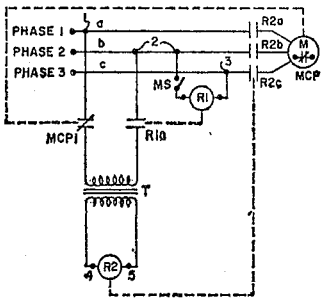

A phase failure protection circuit for a three phase regenerative load comprising a circuit breaker for controlling power to the load and being energized by current from a first phase of the source, a relay having normally open contacts which is energized by a second phase of the source for controlling the circuit breaker energization current, and a thermal switch having normally closed contacts which responds to the temperature of the load for controlling the energization current to either the relay or circuit breaker, wherein the circuit breaker contacts will not initially close if any phase of the source is absent and the circuit breaker will be certain to open if one phase of the source should fail during excitation of the load due to overheating of the load even in the presence of regeneration from the load.

PHASE FAILURE PROTECTION CIRCUIT
FOR A REGENERATIVE LOAD

Original Filed May 7, 1975